(No Model.) 2 Sheets—Sheet 1.

J. N. WILSON.
CLUTCH.

No. 512,643. Patented Jan. 9, 1894.

Witnesses
G. E. Purple
F. S. Lyon

Inventor
James N. Wilson
By Paul␣Merwin
His Atty's.

(No Model.) 2 Sheets—Sheet 2.

J. N. WILSON.
CLUTCH.

No. 512,643. Patented Jan. 9, 1894.

Witnesses
G. E. Purple
P. S. Lyon

Inventor
James N. Wilson
By Paul ǹnerum
His Atty's.

UNITED STATES PATENT OFFICE.

JAMES N. WILSON, OF MINNEAPOLIS, MINNESOTA, ASSIGNOR OF ONE-HALF TO ALBERT H. HALL, OF SAME PLACE.

CLUTCH.

SPECIFICATION forming part of Letters Patent No. 512,643, dated January 9, 1894.

Application filed June 24, 1892. Serial No. 437,828. (No model.)

*To all whom it may concern:*

Be it known that I, JAMES N. WILSON, of Minneapolis, in the county of Hennepin and State of Minnesota, have invented a certain Improved Automatic Clutch, of which the following is a specification.

The object of this invention is to provide an automatic clutch designed to be used in connection with any kind of machinery and provided with one member that is driven from any suitable source of power, and with another member that remains idle until the first member has attained any desired speed for which the device may be adjusted, at which time said second member is automatically clutched or coupled to the first member and the two parts thereafter driven together.

The invention consists generally in an automatic clutch having a shaft with one fixed and one loose member with a centrifugally actuated device for connecting said members together when the fixed member has attained any predetermined speed.

The invention will be more readily understood by reference to the accompanying drawings, forming a part of this specification, and in which—

Figure 1:
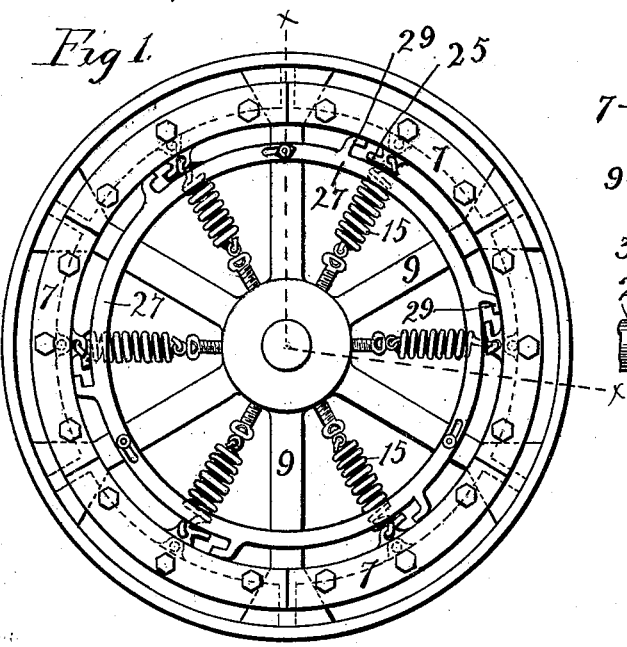
Figure 2:
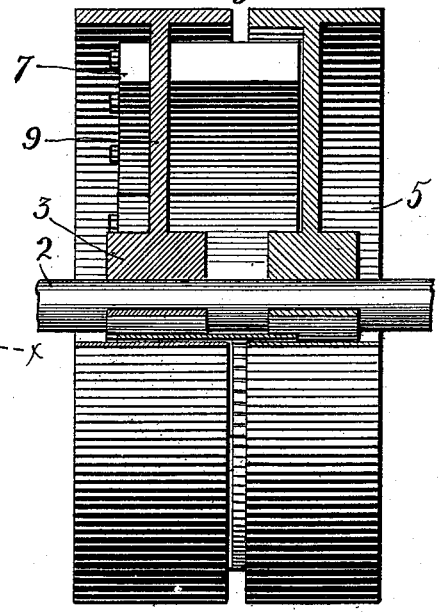
Figure 3:
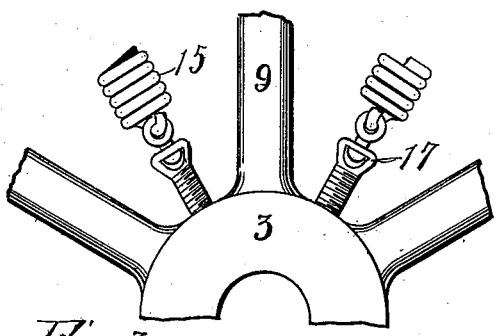
Figure 4:
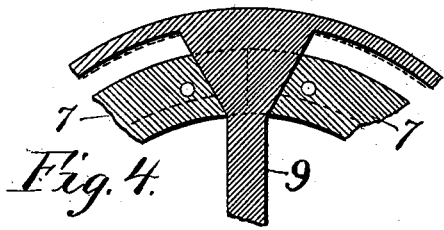
Figure 7:
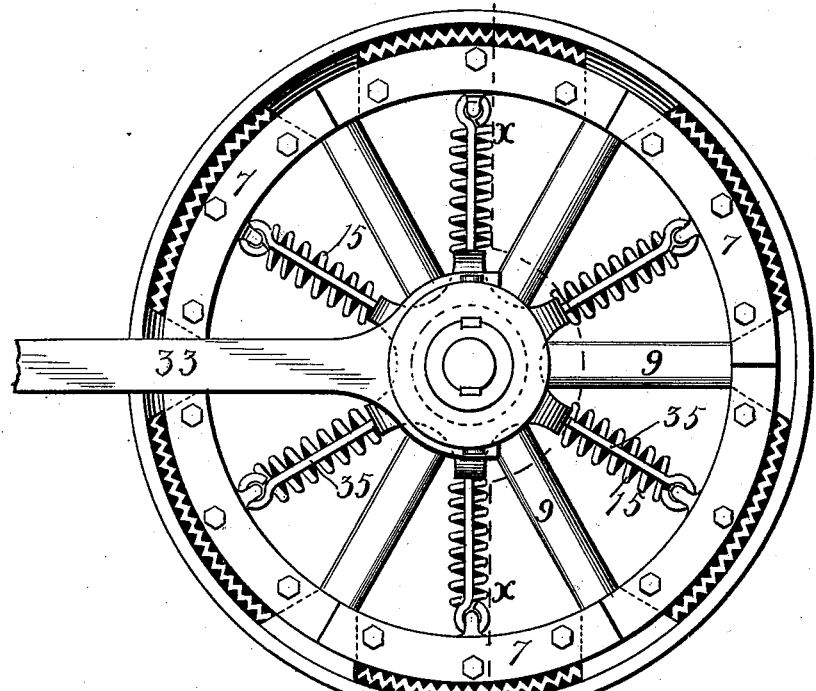
Figure 8:
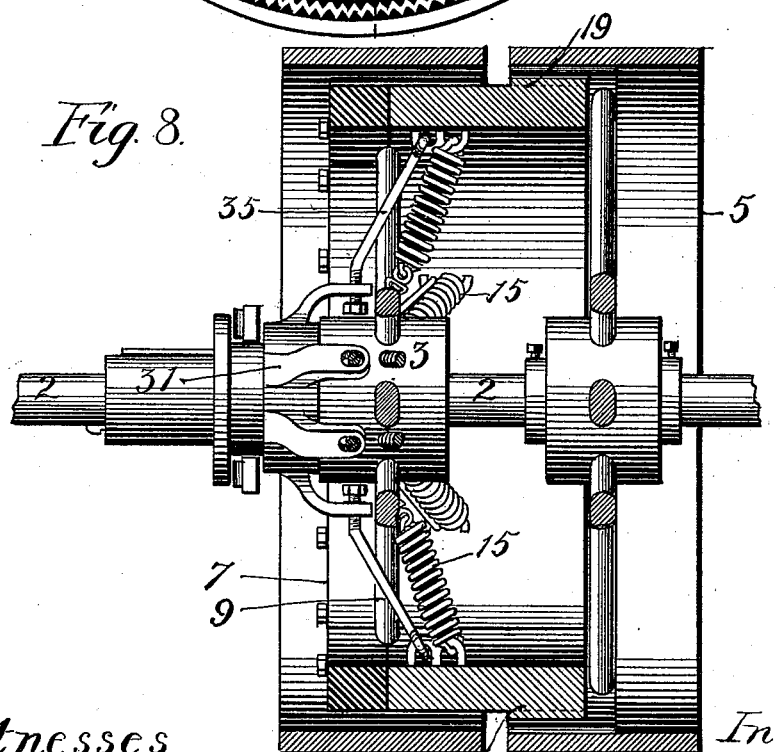

Figure 1 is a side elevation of a device embodying my invention. Fig. 2 is a transverse section on the line x—x of Fig. 1. Figs. 3, 4, 5 and 6 are details, and Figs. 7 and 8 are views showing an uncoupling attachment.

In the accompanying drawings, 2 represents a suitable shaft upon which one member of the clutch is secured so as to rotate therewith and upon which the other member is mounted so as to be loose to turn freely thereon. The clutch may be in any desired form and may be arranged upon its shaft or center in any desired position. I prefer, however, to construct the two members of the clutch in the form of ordinary pulleys each provided with the hub, spokes and rib in the ordinary manner. The clutch member 3 is preferably splined upon the shaft 2 so as to turn therewith as said shaft is rotated. The member 5 is loosely mounted upon the shaft 2 so as to turn freely thereon or permit said shaft to turn while the said member remains stationary. The member 3 which I preferably term the fixed member as it is fixed upon its shaft and turns therewith, is provided with a series of radially movable blocks 7, said blocks being preferably arranged between the spokes 9, and each of said blocks being preferably provided with a segmental plate 11 bolted thereto. Said segmental plate 11 preferably overlaps the ends of the spokes 9, as shown in Fig. 1, and thereby holds the block 7 in position. Said block 7 is preferably connected with the slots 13 which permit the block to move freely in a radial direction upon said spokes 9.

Springs 15 are preferably connected to the blocks 7 and to the adjustable stud or screws 17 secured in the hub of the member 3. These springs are therefore adjustable and by this means the movement of said blocks 7 may be regulated so as to cause the device to operate when it has attained any desired speed.

Figure 5:
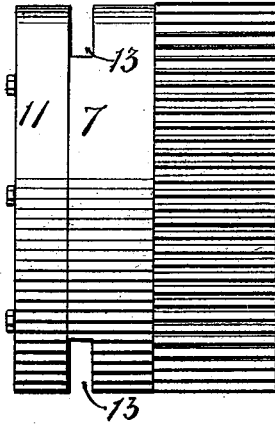
Figure 6:
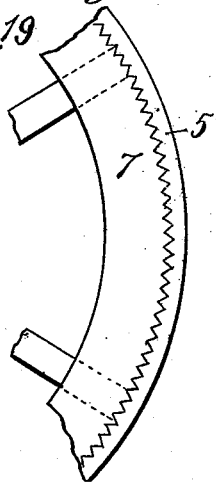

The blocks 7 are provided with the projections 19 that extend beyond the rim of the pulley or member 3 and the outer surfaces of said blocks are preferably serrated or corrugated as shown in Fig. 5.

The inner surface of the loose pulley or member 5 is preferably correspondingly serrated so that it is adapted to be engaged by the outer surface of the blocks 7. It is not essential however that these surfaces be serrated as under ordinary circumstances there will be sufficient friction between the smooth surfaces of the parts to clutch the two members together. It will be understood that the surfaces of the block and the rim may be smooth or serrated as preferred. For the purpose of locking the device in its inoperative position I may provide the blocks with suitable lugs 25 and secure upon the spokes of the fixed member or pulley a locking ring 27 capable of a slight rotative movement and provided with lugs 29 adapted to engage the lugs on the blocks and thereby to prevent said lugs from moving outward. I may also provide means for unclutching the device without stopping it. For this purpose I arrange upon the hub of the fixed pulley a sleeve 31 that is splined thereto. A shipping lever 33 engages this sleeve and a series of links 35 connect this sleeve with the blocks 7. By moving the lever 33 the blocks 7 may at any time be disengaged from the inner surface of the loose member of the clutch.

The details of the construction of the clutch may be varied without departing from my invention.

What I claim as new, and desire to secure by Letters Patent, is—

1. The combination with the fixed pulley or member 3 provided with the series of spokes 9, of the radially movable blocks 7 projecting laterally beyond the rim or flange of said pulley, the segmental plate 11 secured to said blocks and arranged to guide said blocks upon said spokes, the adjustable springs 15 connected to said blocks, and the loose pulley member 5 adapted to be engaged by said blocks, substantially as described.

2. The combination with the fixed pulley or member, of the loose member, the radially movable blocks adapted to engage said loose member, and the locking ring for engaging and holding said blocks, substantially as described.

3. The combination with the fixed pulley or member, of the loose member, the radially movable blocks adapted to engage said loose member and provided with lugs 25, and the locking ring 27 provided with lugs 29 adapted to engage the lugs on said blocks, substantially as described.

In testimony whereof I have hereunto set my hand this 9th day of April, 1892.

JAMES N. WILSON.

In presence of—
A. C. PAUL,
F. S. LYON.